(No Model.)
G. B. ST. JOHN.
THERMOMETER.
No. 365,354. Patented June 21, 1887.
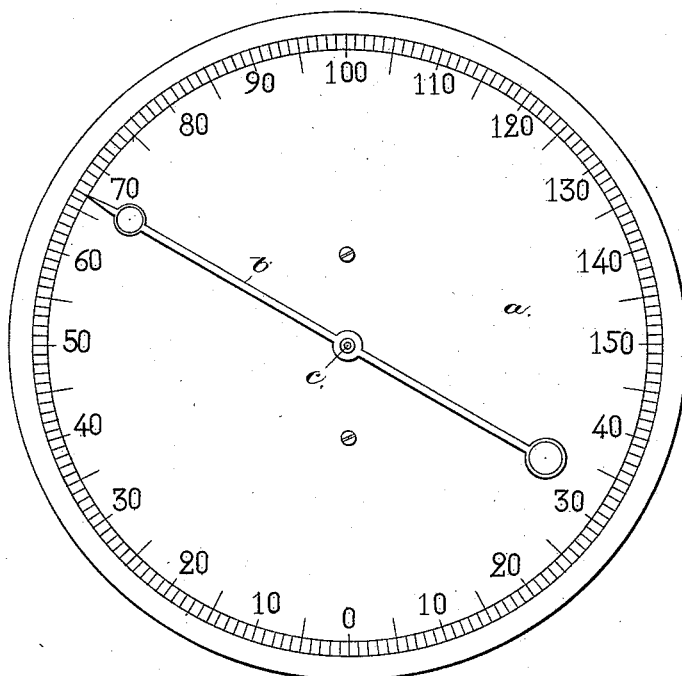
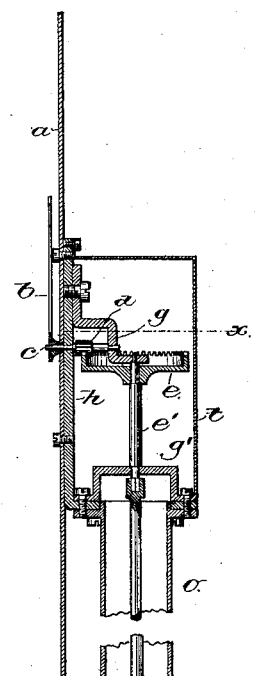
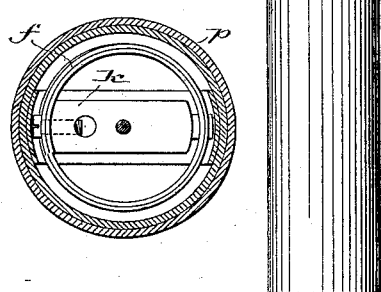
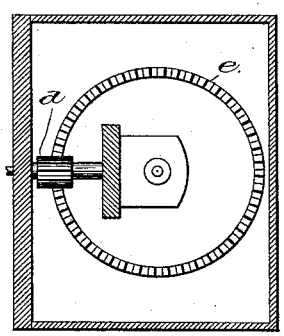
Witnesses.
Arthur Zipperlen.
John F. C. Prindle.
Inventor.
George B. St. John
by Crosby & Gregory
Attys.

UNITED STATES PATENT OFFICE.

GEORGE B. ST. JOHN, OF BOSTON, MASSACHUSETTS.

THERMOMETER.

SPECIFICATION forming part of Letters Patent No. 365,354, dated June 21, 1887

Application filed July 19, 1884. Serial No. 138,168. (No model.)

*To all whom it may concern:*

Be it known that I, GEORGE B. ST. JOHN, of Boston, county of Suffolk, State of Massachusetts, have invented an Improvement in Thermometers, of which the following description, in connection with the accompanying drawings, is a specification, like letters on the drawings representing like parts.

My invention, relating to a thermometer of that class in which the temperature is indicated by a pointer actuated by the expansion and contraction of solid metal, is especially intended for indicating the temperature of a body that differs in temperature from the surrounding atmosphere—as, for instance, that of a liquid in a tank or receptacle.

The invention is embodied in a thermometer in which the dial and pointer and devices for transmitting the movement to the pointer are removed at a greater or less distance from a chamber containing the thermal strip or expanding device, and are connected with the said chamber preferably by a tube which is detachable from the dial and pointer operating devices. The thermal strip is connected by a shaft or arbor with the pointer-operating devices, and the chamber inclosing the said strip is wholly separated from the remainder of the instrument and contains a small amount of air surrounding the thermal strip which will quickly assume the temperature of the material surrounding it.

Figure 1 is a front elevation of a thermometer embodying this invention; Fig. 2, a vertical longitudinal section thereof; and Figs. 3 and 4, transverse sectional details on lines $x\,y$, respectively, of Fig. 2, on a larger scale.

The dial $a$ is graduated to indicate degrees of temperature in connection with the pointer $b$, fixed on an arbor, $c$, provided with a pinion, $d$, meshing with a gear, $e$, which is actuated by a thermal expansion-strip, $f$, as will be described. The said gear $e$ is mounted on an arbor, $e'$, having a bearing at one end in a bracket, $g$, supported on a plate, $h$, connected with the dial $a$. The other end of the said arbor $e'$ has its bearing in a bridge, $g'$, connected with the upturned end of the plate $h$, and the said arbor is squared or otherwise adapted to be coupled with a shaft, $i$, provided with a head or clamping-piece, $k$, connected with the thermal strip $f$, which is preferably helical, as shown, having its other end connected with an attaching-piece, $m$, having a rotary movement on a rod, $m'$, (shown as screw-threaded,) fixed on a frame, $n$, the said device $m$, when properly adjusted, being fixed or held stationary on the rod $m'$ by means of a check-nut, $m^2$.

The frame $n$, which supports the thermal strip $f$, is connected with a neck, $n'$, fitted to and forming a bearing for the lower end of the shaft $i$, the said neck $n'$ being connected with the plate $h$ by a tube, $o$, inclosing the shaft $i$, the said tube being shown as connected with the plate $h$ by the same screws as the bridge $g'$. The shaft $i$ and arbor $e'$ thus form a connection between the thermal strip and the pointer-actuating gearing $d\,e$; but it will be seen that the said gearing and parts supported on the plate $h$ are independent of and detachable from the tube $o$ and thermal strip supported at the end thereof. This enables the main portion of the thermometer to be manufactured in quantities of interchangeable parts by merely varying the length of the tube $o$ and the shaft $i$. The thermal strip may be at any desired distance from the dial and pointer as may be required for various purposes, as, for instance, where it is intended to indicate the temperature of a liquid near the bottom of a deep tank or receptacle.

The end of the thermal strip $f$ is connected with the attaching device or arm $m$ by a clamp or set-screw, $m^3$, by which the said strip may be fastened at any point on its length, thus enabling its length between the two attaching-points to be varied, and adjusted so that a given change in temperature will produce the proper amount of movement of the pointer over the dial which has been previously graduated, thus avoiding the necessity of graduating each dial to correspond with the amount of movement imparted to the pointer by the thermal strip, as would have to be done if there were no means of varying the said movement.

When the strip has been adjusted to give the proper amount of movement, the pointer may be set at the proper graduation on the dial by turning the arm $m$ on the rod $m'$, thus avoiding the necessity of turning the pointer on its arbor $c$ or changing the relation of the gears $d\,g$, the said arm being free to turn in either direction to any desired point.

The frame $n$, with the thermal strip supported by it, is inclosed in a tubular case, $p$, tightly connected with the cap or neck $n'$, which fits closely upon the shaft $i$, so that the thermal strip $f$ is inclosed in a small chamber entirely separated from the rest of the thermometer, which thus indicates the temperature to which the said chamber is exposed without being affected by the temperature of the atmosphere or material surrounding the remainder of the thermometer. The said chamber may contain dry air, or, if desired, it may contain a liquid of suitable character which will not be injuriously affected by the different temperatures to which it may be exposed.

The pointer-actuating devices $d\ e\ e'$ are preferably inclosed in a case, $t$, connected with the frame-work $h$ of the said devices.

The thermal strip may be of any usual construction, being composed of two or more layers of metals having different rates of expansion by heat, iron, or steel and brass being commonly employed, although various other combinations have been and may be used.

I claim—

1. The dial, pointer, the shaft $c$, pinion $d$, gear $e$, and shaft $e'$, constituting the pointer-operating gearing, and bearings for the arbors thereof, combined with the thermal strip, frame to inclose and connect it with the main part of the frame-work inclosing the operating-gearing for the pointer, and the shaft $i$, actuated by the said strip and coupled with the arbor of the pointer-actuating gearing, whereby the said strip and the said shaft may be detached from the pointer-operating gearing without disturbing the latter, substantially as described.

2. The dial, pointer, the shaft $c$, pinion $d$, gear $e$, and shaft $e'$, constituting the pointer-operating devices, combined with the helical bimetallic thermal strip having one end connected with the pointer-operating devices, and an attaching-arm and clamping device for receiving the said strip at another point and adjusting its effective length, the said arm being adjustable for setting the pointer with relation to the graduations of the dial, substantially as described.

3. The combination, with the case $n$, the thermal strip, the arm $m$, and clamp to fix the said strip at any desired point with relation to the said arm, of the supporting-rod $m'$, erected in the said case, and upon which the said arm is made vertically adjustable, substantially as described.

In testimony whereof I have signed my name to this specification in the presence of two subscribing witnesses.

GEORGE B. ST. JOHN.

Witnesses:
 JOS. P. LIVERMORE,
 W. H. SIGSTON.